United States Patent [19]

Åbom

[11] Patent Number: 4,911,340

[45] Date of Patent: Mar. 27, 1990

[54] ARRANGEMENT IN AN INJECTION MECHANISM

[75] Inventor: Jan V. Åbom, Västra Frölunda, Sweden

[73] Assignee: Bengt Gunnar Törnqvist, Stockholm, Sweden; a part interest

[21] Appl. No.: 211,859

[22] PCT Filed: Oct. 21, 1987

[86] PCT No.: PCT/SE87/00489

§ 371 Date: Jul. 20, 1988

§ 102(e) Date: Jul. 20, 1988

[87] PCT Pub. No.: WO88/03224

PCT Pub. Date: May 5, 1988

[30] Foreign Application Priority Data

Oct. 27, 1986 [SE] Sweden .............................. 8604584-6

[51] Int. Cl.⁴ .............................................. G01F 11/00
[52] U.S. Cl. ................................... 222/636; 222/264;
222/368; 222/148; 406/52; 239/555
[58] Field of Search ............... 222/148, 130, 636, 637,
222/264, 368; 239/410, 412, 416.1, 417.5, 555,
570, 571; 406/52

[56] References Cited

U.S. PATENT DOCUMENTS

| 1,994,239 | 3/1935 | Beekhuis | 239/555 |
|---|---|---|---|
| 3,126,132 | 3/1964 | Lyon et al. | 222/363 |
| 3,964,513 | 6/1976 | Molner | 222/264 |
| 4,227,835 | 10/1980 | Nussbaum | 222/636 |
| 4,463,736 | 8/1984 | Hayward, Jr. | 222/368 |

FOREIGN PATENT DOCUMENTS 1526739 1/1972 Fed. Rep. of Germany .
386955 8/1976 Sweden .

Primary Examiner—Kevin P. Shaver
Assistant Examiner—Kevin P. Reiss
Attorney, Agent, or Firm—Shapiro and Shapiro

[57] ABSTRACT

Injection mechanism for powder and the like comprising a movable disc (II) with a number of throughholes (6) and two stationary members (I, III), each having a number of openings (1,2 and 3, 4, 5) communicating with a powder supply, a propellant gas source and a powder receiving unit, respectively, wherein the two faces of the disc each faces a closely mating face of each of the members and wherein in defined relative positions holes (6) at the disc (II) are in alignment with openings (1-5) in the members (I, III). The surfaces of the stationary members (I, III) presented spaced apart depressions (7) communicating with an adjustable pressure oil source and an adjustable spring action device acts against the members with opposite direction.

10 Claims, 4 Drawing Sheets

ARRANGEMENT IN AN INJECTION MECHANISM

The present invention relates to an arrangement of the type as defined in the appended main claim.

An injection mechanism usually comprises at least one chamber which serves as a dosing unit and which is arranged in conjunction with a member movable relative to an adjacent member. The chamber is adapted to be alternately connected to (a) a vacuum source for evacuation of the air, (b) a supply of powder to be injected, and (c) both a pressure gas source and an outlet duct.

The vacuum is used for filling the chamber with powder which, in a subsequent step, is ejected by pressure gas.

Injection mechanisms of this type are much used for the dosing of powders. One application is the injection of solid fuel powder into Otto engines, diesel engines, gas turbines, furnaces and other combustion units.

Injection mechanisms can also be used for injection of adsorbing or absorbing powders into air or gases, e.g. adsorbing powder into air mixed with solvents, the powder consisting of activated carbon or zeolites. In combustion units, lime powder can be injected to bind $SO_2$. If the combustion gases can be cooled to 40° C. and lower, even $NO_x$ and polyaromatic hydrocarbons can be adsorbed by activated carbon powder.

One problem with powder having a small particle size is its tendency to agglomerate. An injection mechanism providing a pulsating flow eliminates this tendency, and it has been shown that by choosing a suitable pulse repetition frequency, a complete separation of the powder grains or particles can be achieved. For example, for lime powder having a particle size of 0–10μ, the pulse repetition frequency should be 55 Hz.

An injection mechanism of the above type is disclosed in Swedish patent 386,955. Powders of solid substances, such as wood, peat, coal and brown coal, used as fuel, cause heavy wear, and this applies to an even higher extent also to powder of activated carbon, zeolites and lime intended for other purposes.

The object of this invention is to provide an arrangement which eliminates not only the wearing effect of the powder passing through, but also the problem of establishing a reliable seal between mutually movable parts.

The characteristic features of the arrangement according to the invention are stated in the appended claims.

Thus, the basic idea of the invention resides in the provision of gaps of adjustable and controllable width between mutually movable parts, i.e. a rotatable intermediate disc and, on both sides thereof, fixed discs.

One embodiment of the arrangement according to the invention will be described in greater detail below, reference being had to the accompanying schematic drawings in which.

Figure 1:
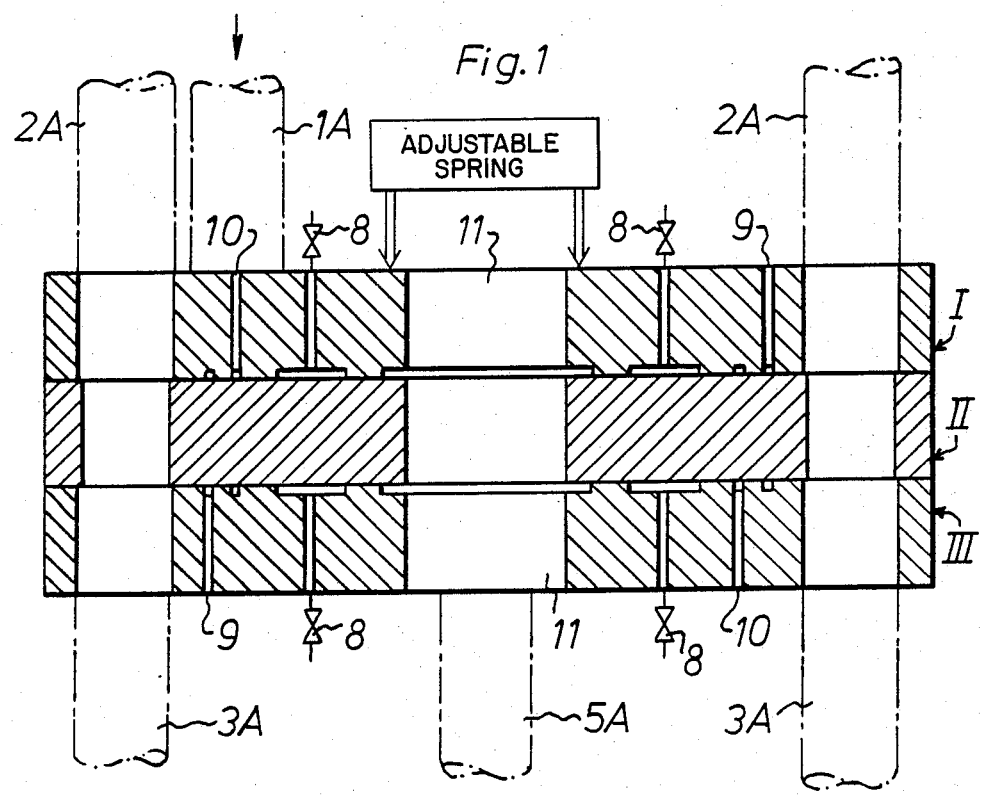
FIG. 1 is an axial cross-section of the main components of the injection mechanism.
Figure 2:
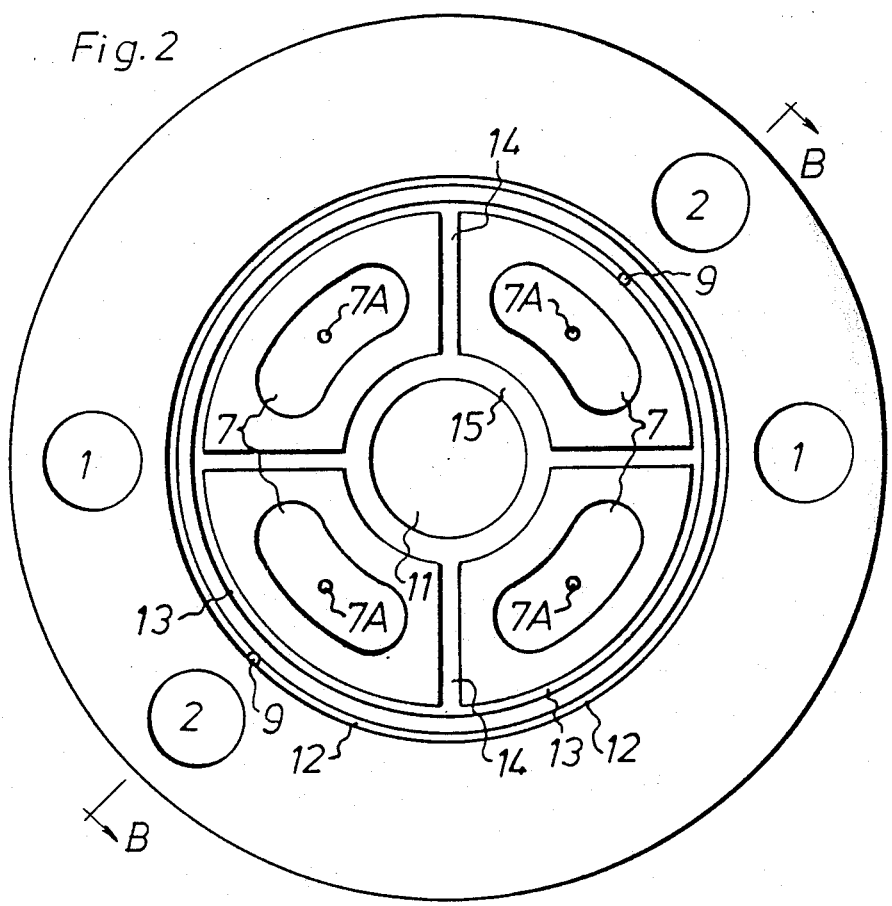
FIG. 2 shows a stationary upper disc included therein, as seen from below.
Figure 3:
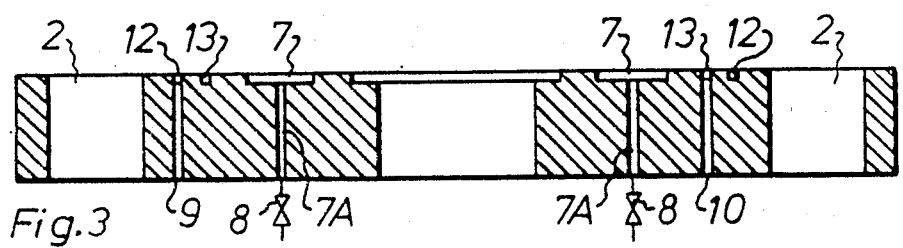
FIG. 3 is a cross-section of the same disc along line B—B in FIG. 2.
Figure 4:
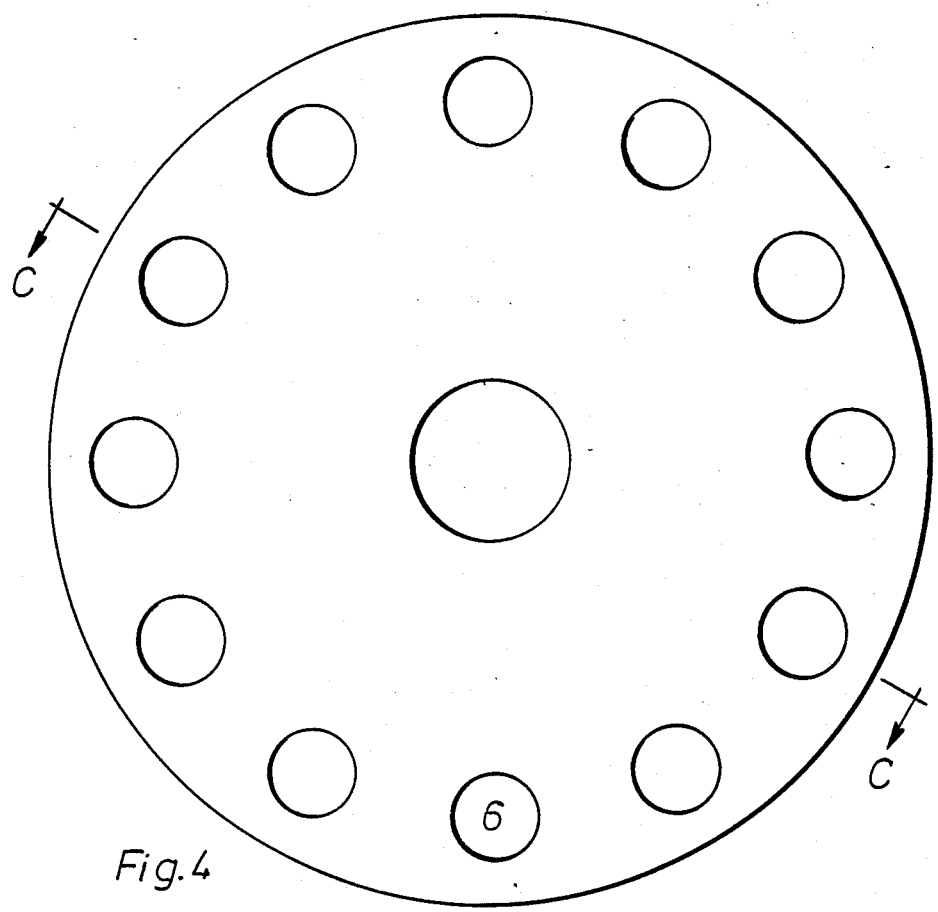
FIG. 4 is a top plan view of a rotatable intermediate disc.
Figure 5:
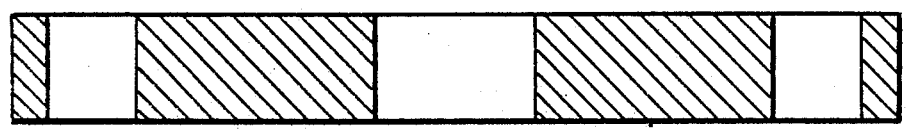
FIG. 5 is a cross-section of the same disc along line C—C in FIG. 4.
Figure 6:
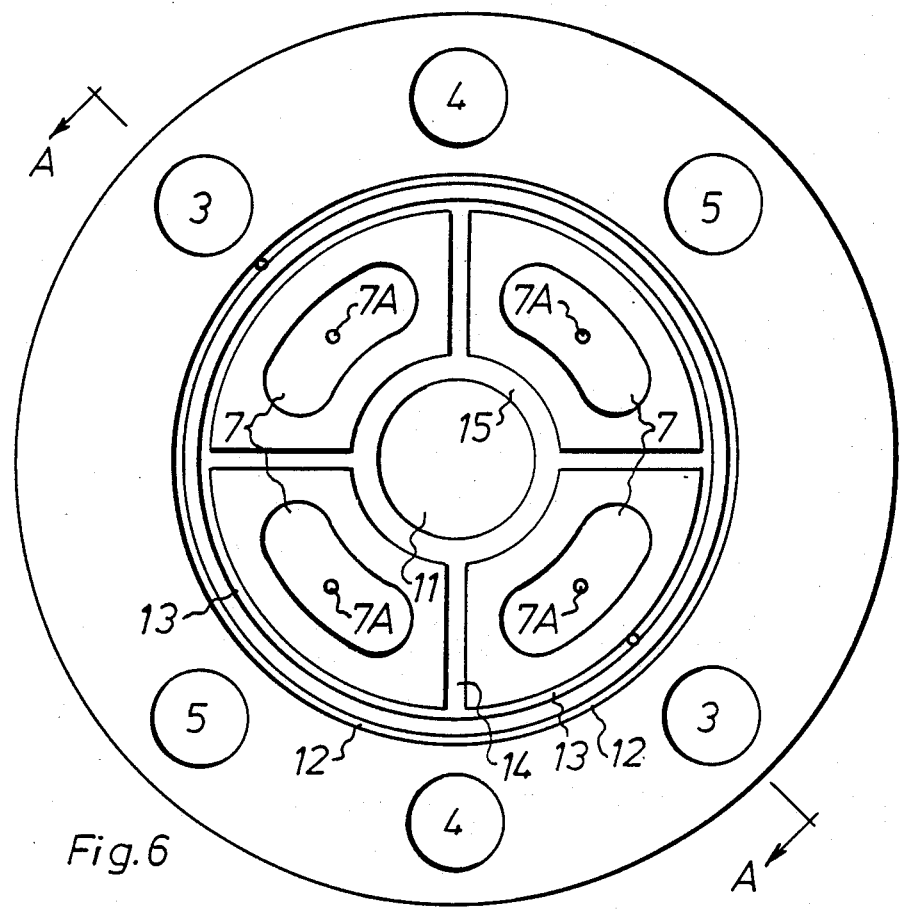
FIG. 6 is a top plan view of a stationary lower disc.
Figure 7:
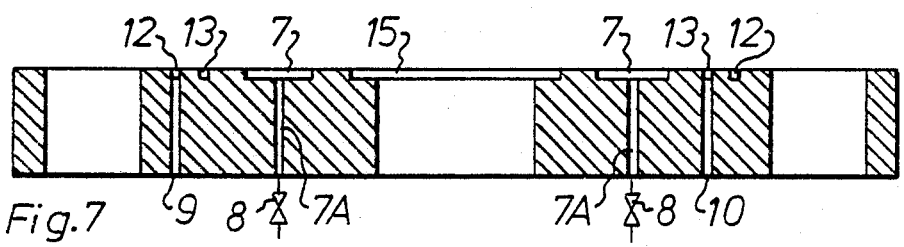
FIG. 7 is a cross-section of the same disc along line A—A in FIG. 6.

The drawing merely shows the components which are necessary for the understanding of the invention, and any auxiliary equipment, such as the driving gear, the apparatus housing and the like, has been omitted. The pipes etc. connected to the injection mechanism have been indicated schematically only.

The main components of the injection mechanism are three discs, an upper disc I, an intermediate disc II and a lower disc III, all of which have a number of through-holes disposed along the same circular arc, which causes the holes to overlap each other in their different turning positions. The upper disc I comprises four such holes, of which two opposing holes 1 are connected to pipes 1A for feeding powder from a suitable powder container, and two holes 2 are connected to one or more injection nozzles or the like via pipes 2A.

The lower disc III has six holes opposing each other in pairs, of which the pair designated 3 is connected via a pipe 3A to a pressure air or pressure gas source, the pair designated 4 is connected to a vent pipe (not shown), and the pair designated 5 is connected to a vacuum source via a pipe 5A.

The intermediate disc II has a number of holes 6 equidistantly spaced apart around the disc and forming chambers which, depending upon the turning position, are open towards one of the holes in the upper and the lower disc, or are closed.

The upper and the lower disc I and III comprise spaced apart so-called oil pockets 7 which are concentrically arranged around a central spindle opening 11 and which, via axially extending ducts 7A, communicate with a pressurized oil supply having a control valve 8.

Radially inward from the holes 1–2 and 3–5, respectively, an outer annular groove 12 is arranged which is supplied with cleaning air or gas via ducts 9, and inside said groove, a further annular groove 13 is arranged which communicates via ducts 10 with a cleaning air outlet. The annular groove 13 communicates via radial ducts 14 with a duct 15 encircling the spindle opening 11.

A drive spindle (not shown) extends freely through the spindle openings 11 of the upper and the lower disc I and III, but is nonrotatably connected with the intermediate disc II. The upper and the lower disc I and III are nonrotatable, but one of them, preferably the upper, is axially displaceable. Also the intermediate disc II can be slightly displaceable in axial direction. Alternatively, both the upper and the lower disc can be displaceable relative to an axially nondisplaceable intermediate disc. The connections between the upper and the lower disc and the respective pipes are, of course, arranged so as to provide the necessary sealing, independently of the position of displacement.

Before start, the discs are compressed by applying, preferably to the upper disc, a predetermined spring pressure as indicated diagrammatically in FIG. 1, which causes the discs to closely engage each other. After that, pressurized oil is supplied through the ducts 7A via the control valves 8 to the oil pockets 7, whereby the discs will be sligthly separated, the desired gap size being set by means of the control valves 8.

The gaps are adjusted to the powder to be injected. For example, for dolomite 0–10μ, the upper gap should be 25μ and the lower 20μ. For dolomite 0–30μ, an upper gap of 45μ and a lower gap of 40μ are required. Powder of activated carbon 0–75μ requires an upper gap of 40 and a lower gap of 40μ. For wood powder to be supplied to diesel engines, an upper gap of 5 and a lower gap of 3μ have been found appropriate. Wood and peat powder 0–50μ intended for gas turbines requires an upper and a lower gap of 20μ.

The injection mechanism operates as follows. By aligning one of the holes or chambers 6 with one of the two holes 5 which are connected to the vacuum source, a vacuum is produced and maintained in the chamber 6 while the chamber moves towards one of the powder supply holes 1. Under the action of the vacuum, this hole is rapidly filled with powder. The hole with the powder therein then reaches one of the holes 3 which are connected to the pressure air source and which are aligned with the holes 2 connecting with the duct 2A through which the powder is conducted to the ejection point. The pressure air shock which arises when the chamber 6 is aligned with the pressure air and outlet holes 3 and 2, respectively, ejects the powder from the chamber. The empty chamber then reaches the venting hole where any remaining excess pressure is exhausted.

The cleaning air injected through the ducts 9 has a higher pressure than the pressure air acting in the chamber 6 and entering through the holes 3. The cleaning air thus prevents oil from the pressure oil pockets 7 from forcing its way out between the discs, reaching the holes 1–6 and mixing with the powder. The cleaning air also prevents powder particles from penetrating into the gaps between the discs. Oil from the oil pockets is collected by the inner annular groove 13 and by the duct encircling the spindle hole and is conducted away together with the escaping cleaning air through the ducts 10. Then the oil can be separated from the cleaning air and be re-used.

The gaps between the discs are set by adjustment of the spring force acting on the upper disc and of the oil pressure acting in the oil pockets 7. The accuracy of the adjustment can be to within as little as 0.2μ, and such accuracy is unobtainable with slide or roller bearings. Even if it would be technically possible to design a slide or roller bearing with such tolerances, the bearing would maintain the tolerances but for a very short time.

It is of great importance to the function of the mechanism not only that the gaps can be kept at a definite minimum value, but above all that a definite maximum value is not exceeded. In fact, the mechanism cannot function if the gap is wider than about 50μ, since the leakage would be far too large.

An injection mechanism arranged according to the invention and having a disc diameter of 500 mm and a speed of 250 rpm can inject 1,500 kg of powder per hour. It has been found that after 100 hours of operation, the gaps have been maintained at the values set within a tolerance of 2μ.

I claim:

1. An arrangement in an injection mechanism for powder and the like, comprising:
   an inner member relatively slidably movable between a pair of outer members having respective surfaces fitted face-to-face substantially against opposite surfaces of said inner member, at least two of said inner member and said outer members being displaceable substantially perpendicular to a given position of the opposite surfaces of said inner member,
   said outer members having respective first holes in communication with corresponding portions of a high pressure propellant gas line, and one of said outer members having at least one second hole in communication with a powder supply,
   said inner member having at least one hole which, by said relative movement, may be brought selectively into alignment with said second hole for receiving powder from said supply and with said first holes for discharging the received powder in a flow of said propellant gas,
   means defining depressions at the facing surfaces of said inner and outer members,
   means for supplying pressurized fluid to the depressions to force the facing surfaces of said inner and outer members slightly apart from one another by the action of the fluid pressure, and
   spring action means for urging the inner and outer members together,
   said spring action means and said pressurized fluid supplying means being adjusted such that gaps of predetermined size are established between the facing surfaces of said inner and outer members by the force of said fluid pressure and by a counteracting force of said spring action means.

2. An arrangement according to claim 1, wherein said inner member is a disc-like member rotatable between said outer members on an axis of said disc-like member, and said outer members are non-rotatable about said axis.

3. An arrangement according to claim 2, wherein said depressions are formed in said surfaces of said outer members and arranged circumferentially about said axis.

4. An arrangement according to claim 3, wherein said surfaces of said outer members have respective pairs of circumferential grooves disposed between their respective holes and depressions, the radially outer groove of each pair being connected to means for supplying a cleaning gas thereto under pressure exceeding that of said propellant gas, and the radially inner groove of each pair being connected to a respective outlet for the cleaning gas.

5. An arrangement in an injection mechanism for powder and the like, comprising:
   a disc-like inner member having substantially parallel axial end surfaces and mounted on a drive spindle for rotation therewith on the axis of said inner member,
   a pair of outer members non-rotatable relative to said inner member and having respective surfaces fitted substantially face-to-face against said end surfaces of said inner member,
   at least two of said inner member and said outer members being displaceable along the axis of said inner member,
   said outer members having respective first holes in communication with corresponding portions of a high pressure propellant gas line, and one of said outer members having at least one second hole in communication with a powder supply,
   said inner member having at least one hole which, by rotation of said inner member by said drive spindle, may be brought selectively into alignment with said second hole for receiving powder from said supply and with said first holes for discharging the received powder in a flow of said propellant gas, means defining depressions at the facing surfaces of said inner and outer members, means for supplying pressurized fluid to the depressions to force the facing surfaces of said inner and outer members slightly apart from one another by the action of the fluid pressure, and spring action means for urging the inner and outer members together, said spring action means and said pressurized fluid supplying means being adjusted such that gaps of predetermined size are established between the facing surfaces of said inner and outer members by the force of said fluid pressure and by a counteracting force of said spring action means.

6. An arrangement according to claim 5, wherein said depressions are formed in said surfaces of said outer members and arranged circumferentially about the axis of said inner member.

7. An arrangement according to claim 6, wherein said surfaces of said outer members have respective pairs of circumferential grooves disposed between their respective holes and depressions, the radially outer groove of each pair being connected to means for supplying a cleaning gas thereto under pressure exceeding that of said propellant gas, and the radially inner groove of each pair being connected to a respective outlet for the cleaning gas.

8. An arrangement according to claim 5, wherein the outer member not having said second hole has an additional hole in communication with a vacuum source and wherein said hole of said inner member may be brought selectively into alignment with said additional hole for application of a vacuum thereto, and subsequently into alignment with said second hole for drawing powder into said hole of said inner member under action of the vacuum therein.

9. An arrangement according to claim 8, wherein said inner member has a plurality of holes as aforesaid, said plurality of holes being spaced circumferentially of said inner member.

10. An arrangement according to claim 5, wherein said outer members are disc-like members.

* * * * *